United States Patent [19]

Lorsch

[11] 4,091,963

[45] May 30, 1978

[54] APPARATUS FOR SORTING PLANAR STRUCTURES HAVING NON-ROUND OUTER CONTOURS, SPECIFICALLY SLIDE FRAMES

[76] Inventor: Johannes Lorsch, An der Bleiche 49, D-4172 Straelen, Germany

[21] Appl. No.: 675,702

[22] Filed: Apr. 12, 1976

[30] Foreign Application Priority Data

Apr. 12, 1975 Germany .............................. 2516051

[51] Int. Cl.² .............................................. B65G 59/06
[52] U.S. Cl. .................................................. 221/264
[58] Field of Search ....................... 221/21, 93, 94, 124, 221/129, 131, 299, 300, 264, 265; 222/42, 48; 214/8.5 R, 8.5 BF, 8.5 H, 8.5 K, 6.2 BA; 116/129 E, 129 F; 198/468, 524, 572, 718, 719, 856

[56] References Cited

U.S. PATENT DOCUMENTS

| | | | |
|---|---|---|---|
| 1,526,526 | 2/1925 | Burke | 116/129 F |
| 1,648,476 | 11/1927 | DuGrenier | 221/264 |
| 2,865,156 | 12/1958 | Wolfson | 221/93 X |
| 2,940,327 | 6/1960 | Gartner | 214/6.2 BA X |
| 3,212,718 | 10/1965 | Green | 222/48 X |
| 3,313,441 | 4/1967 | Fadden | 222/48 X |
| 3,325,051 | 6/1967 | Davis | 221/93 |
| 3,363,746 | 1/1968 | Griswold et al. | 198/856 X |
| 3,527,338 | 9/1970 | Mita | 198/718 |
| 3,552,602 | 1/1971 | Duncan | 214/8.5 H |
| 3,902,587 | 9/1975 | Checcucci | 198/718 X |
| 4,013,193 | 3/1977 | Lorsch | 221/264 |

Primary Examiner—Robert B. Reeves
Assistant Examiner—Fred A. Silverberg

[57] ABSTRACT

The present invention pertains to a device for the sorting of planar structures having non-round outer contours, in particular slide frames, with several dispensing chutes provided to receive supply stacks, together with singling means provided at the dispensing chutes for the single dispensing of the planar structures, and cross-transport means following thereafter for the transport of the singled planar structures onto a lengthwise transport means, which may be followed by a stacking means.

4 Claims, 3 Drawing Figures

APPARATUS FOR SORTING PLANAR STRUCTURES HAVING NON-ROUND OUTER CONTOURS, SPECIFICALLY SLIDE FRAMES

BACKGROUND OF THE INVENTION

With such devices a sorting of a plurality of mutually similar planar structures can take place, in such a way that a sequence of different planar structures corresponding to the number of dispensing chutes is assembled. In practice, such devices are used, for example, to assemble framed slides to form a specific picture sequence. There are in the individual dispensing chutes similar frames slides, and it can now be achieved with the device that a sequence of different slides corresponding to the number of dispensing chutes is assembled. This sequence is stacked, for example, in a stacking means following the device, or is introduced into a magazine.

SUMMARY OF THE INVENTION

It is the object of the invention to increase the operating speed of such known devices, and at the same to make sure that, should irregularities occur in the course of operation, it is assured that the planar structures or slide frames are not destroyed nor the device damaged.

To solve the first partial problem underlying the invention, it is provided that the singling means are designed as rotary slide valve systems with rotary valves reciprocating between positions aligned with the inside aperture of the dispensing chutes and discharge chutes arranged therebelow, and that the rotary valve are drivable via a common control means.

By the use of the rotary valves, the operating speed can be greatly increased in comparision with conventional, linearly movable slide valve systems. Such a rotary valve system is described in German Utility Model No. 74 31 911. The common control means for all rotary valves permits a simple construction.

According to another feature of the invention, the control means for the rotary valves includes a control shaft reciprocating in the direction of the dispensing chute arrangement, on which shaft control lever systems are arranged crosswise to the length of the shaft and articulated to the rotary valves.

According to a further feature of the invention, it is provided that the control means for the rotary valves includes overload protection means. These overload protection means are expediently associated with each rotary valve. The overload protection means go into action when a planar structure or slide frame has indeed gotten into the region of the rotary valve, but due to canting or the like it is not possible to turn the rotary valve so that the planar structure or slide frame can get into the receiving chute therebelow, or respectively, into the zone of the cross-transport means.

According to a further feature of the invention, the overload protection means are provided on the control lever systems. The control lever systems comprise lever systems, preferably pivoted for swinging movement, in the direction of the plane of the rotary valves, to which the rotary valves are articulated, and which under the action of tensioning force apply against a stop fixed in relation to the control shaft. The torque acting on the lever system through the tensioning force is greater than the torque occurring under normal operating conditions at the lever system when the rotary valve system rotates. Further there is provided a responding means which goes into action when the lever system is pivoted out counter to the action of the tensioning forces.

Expediently, it is provided that the lever systems are designed as two-armed levers, one lever arm being articulated to the rotary valve, and the other lever arm being subjected to the action of the tensioning force.

According to a further feature of the invention, it may be provided that the stops fixed relative to the control shaft are arranged on base bodies which are mounted fast on the control shaft, and on which the two-armed levers are pivotally mounted.

To produce the tensioning force it may be provided in an expedient embodiment of the invention that a spring is arranged between the lever system and a reference point fixed relative to the control shaft.

In further development of the invention, the spring may be designed as an extension spring arranged between the lever arm not mounted on the rotary valve and the next following base body.

An especially simple design results when the extension spring is provided on the side of the base body opposite the stop.

According to the invention, the responding means of the overload protection means comprises a shift rod arranged in the direction of the control shaft and in the zone of the lever systems and movable in its longitudinal direction, the said rod being tensioned in the direction of the tensioning forces acting on the lever system. The lever systems bear against control cams fixed on the shift rod. A switch operable by the shift rod and connected with a trigger means is provided. The design of the arrangement is chosen so that the torque produced by the tensioning force of the extension spring and the tensioning force of the shift rod jointly is greater at the lever system under normal operating conditions fixed relative to the base bodies and hence relative to the control shaft, and with the free ends of the lever arms turned toward the rotary valves, these are moved to and fro. Only when a defect occurs, for example canting of a slide frame in one of the rotary valves, does the overload protection means go into action, in that the two-armed lever pivots out counter to the action of the tensioning spring and the shift rod is moved by the pressure against the corresponding control cam counter to the action of its tensioning force in such a way that the shift rod cannot touch the switch connected with the trigger means. In this case a signal is produced, by means of which the device is stopped via an arrangement (not explained in detail). The control cams may be designed, for example, as setting rings.

According to a further feature of the invention, means for indicating the angular position of the rotary valves may be provided. In an expedient design, said means consist of visually recognizable marks. In this way the operator of the device can easily see which of the rotary valves causes the defect in the case of a standstill of the machine by response of the overload protection means.

According to a further feature of the invention, it is provided that the cross-transport means comprise swinging slide pusher rods engaging through slots in a slideway for the planar structures and provided to apply against the planar structures, and that the swinging slide pusher rods are jointly pivotable on a pivot shaft, and that a defect-response means is associated with the swinging slide pusher rods system. This measure, too, contributes to bringing about maximum safety of operation of the device according to this invention, combined with simplest possible construction.

According to a further feature of the invention, the defect-response means comprises a spring arranged between a lever fixed on the pivot shaft and a stationary point. A one-armed lever mounted on the pivot shaft rides against an eccentric producing the swinging motion of the swinging slide pusher rods, under the action of the spring force, and the couple acting on the swinging slide pusher rods system through the spring force is greater under normal operating conditions over the entire movement path of the swinging slide pusher rods than the oppositely acting couple caused by the frictional forces between the planar structures and the slideways. Further, there is provided a switching means connected with a trigger means which, when the end position of the eccentric lies in operative direction of the spring force and the one-armed lever does not apply against the eccentric, delivers a trigger signal.

According to a further feature of the invention, a mechanical locking means is provided in the end position of the swinging slide pusher rods opposed to the operative direction of the spring force.

With the defect-response means it is achieved that even if a planar structure or slide frame jams in the cross-transport means or some other defect occurs, a destruction of the planar structure or slide frame is prevented and the swinging slide pusher rods are all stopped instantaneously as soon as the forces to be exerted are much greater than the normal forces. By the action of the switching means, the swinging slide pusher rods drive is likewise stopped at the end of its corresponding movement phase. The locking means serves to be able to eliminate the defect without the occurrence of uncontrollable or undesirable swinging slide pusher rods movements due to the action of the spring.

BRIEF DESCRIPTION OF THE DRAWINGS

The invention will be explained below with reference to the embodiment illustrated schematically in the drawings.

DESCRIPTION OF THE PREFERRED EMBODIMENT

Figure 1:
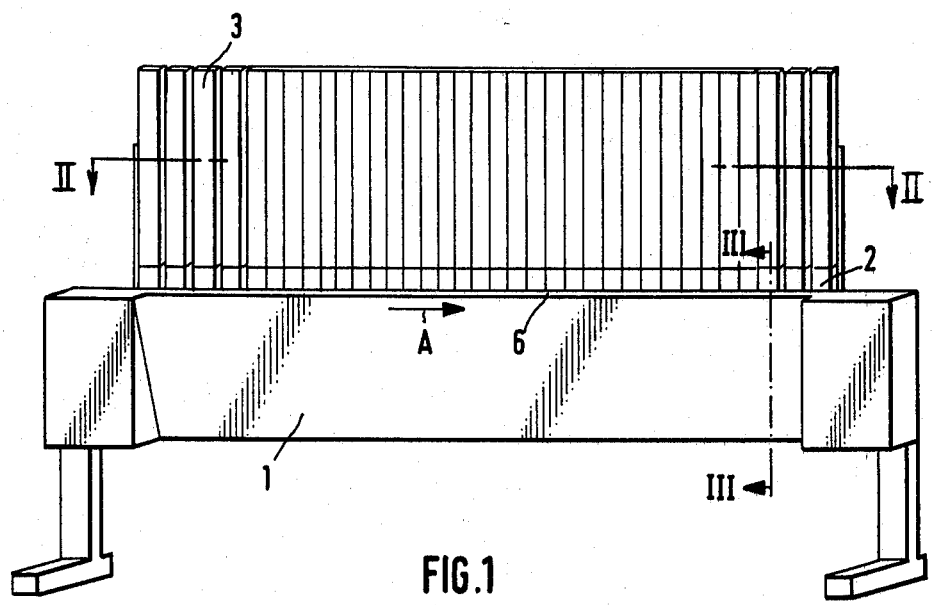
FIG. 1 shows a schematic perspective view of a device for sorting slide frames.

The device for sorting slide frames comprises on a base frame 1 dispensing vertical chutes 2 arranged side by side, above which exchangeable magazines 3 are arranged. In the view shown in FIG. 1, only the dispensing chutes 2 and magazines 3 present in the end regions are represented, while the intermediate dispensing chutes and magazines are represented schematically. The magazines contain stacks of identical framed diapositve slides, in the following called slide frames. At the lower end of each single dispensing chute 2 is arranged singling means 4 (see FIG. 2). The singling means 4 are omitted in FIG. 1 for clearer representation. Below the singling means 4 are arranged cross-transport means 5 (FIG. 3), whereby the individual slide frames are supplied to a lengthwise transport means 6. The arrangement works so that one slide frame is released from each dispensing chute 2 by the singling means 4 and is supplied by the cross-transport means 5 to the lengthwise transport means 6. Accordingly, slide frames from the various dispensing chutes lie one behind the other on the lengthwise transport means 6. On the lengthwise transport means 6, the slide frames are then carried away in the direction of the arrow A; being supplied, for example, to a stacking means (not shown).

The singling means 4 are designed as rotary valve systems. The dispensing chutes 2, whose inside aperture approximately matches the outside dimensions of the slide frames, some clearance being of course provided, are arranged offset by an angle 7 relative to discharging chutes present therebelow and having a similar inside aperture, the dispensing chutes 2 and the discharging chutes being arranged one above the other in centered alignment. Between the dispensing chutes 2 and the discharging chutes, rotary valves 8 reciprocating crosswise thereto are arranged, which have the same aperture cross-section as the dispensing chutes 2 and the discharge chutes. The pivot movement can take place so that the rotary valves 8 are aligned once with the inside aperture of the dispensing chutes 2 and another time with the inside aperture of the discharge chutes. The discharge chutes are marked with the reference numeral 9.

The singling means works as follows: Stacks of slide frames are arranged in the dispensing chutes 2 according to the angular position of the dispensing chutes 2. When the rotary valve 8 is aligned with the position of the discharge chute 9, the bottom slide frame lies on the upper region of the rotary valve, which due to the offset position extends into the inside aperture of the dispensing chute. Now, the rotary valve is pivoted so that its inside aperture is aligned with the inside aperture of the dispensing chute 2, the bottom slide frame drops into the inside aperture of the rotary valve. However, this slide frame cannot continue to fall because the discharge chute 9 is arranged angularly offset, and the slide frame thus falls onto the region protruding into the region of the aligned inside aperture of the dispensing chute 2 and of the rotary valve 8. When the rotary valve is pivoted back, the slide frame present in its inside aperture is at the same time pivoted so that its outer contours are aligned with the inside aperture of the discharge chute 9, and thus the slide frame can fall onto the cross-transport means 5. The dimensions of the rotary valve system are such that only one slide frame drops, or is singled out.

The control of the rotary valves 8 occurs through a common control means 10. The control means 10 comprises a control shaft 11 reciprocating in the longitudinal direction of the arrangement of the dispensing chutes 2. The direction of movement of the control shaft 11 is indicated by the arrow B. On the control shaft 10 are provided control lever systems 12 arranged transverse to the length of the shaft and articulated to the rotary valves 8. Lever systems 12 comprise levers pivoting in the direction of the plane of the rotary valves 8 and designed as two-armed levers 13. The lever arms 13 are pivotally mounted on base bodies 14, namely in pivot shafts 15. One lever arm 13a of the two-armed lever 13 is articulated to the rotary valve 8. For this purpose, it has a slot which embraces a pin 16 on the rotary valve 8. Under tension of the extension spring 17, the other lever arm 13b of the two-armed lever bears against a stop 18 provided on the base body 14. By its other end, the extension spring 17 is mounted on the side of the base body 14 of the adjacent arrangement opposite stop 18. In the normal position the arrangement functions so that the two-armed lever 13 is spring-tensioned in longitudinal direction of the base bodies 14 and does not pivot out when the control shaft 11 moves to and fro in the direction of the arrow B. Accordingly, during reciprocating movement of the control shaft 11, all rotary valves 8 are moved to and fro by action of the lever arm 13a.

The two-armed, spring-tensioned lever 13 forms part of an overload protection, which is intended to prevent harmful effects of a canting or jamming of a slide frame in one of the rotary valve systems. If a slide frame jams in the inside aperture of one of the rotary valves 8, and it is therefore not possible to pivot this rotary valve so that its inside aperture is aligned with that of the discharge chute 9, normally this slide frame would be destroyed. The overload protection means, however, prevents this, since in such a case, that is, when the force to be exerted for the pivoting back of the rotary valve is greater than a tensioning force determined by the associated spring 17 of the respective two-armed lever 13, the said two-armed lever pivots out, namely into the position 13c shown in FIG. 2 center, in dash-dot lines. The rotary valve at which the defect occurs is thus not pivoted, while the other rotary valves are pivoted. The tensioning force of the extension springs 17 are thus rated so that under normal operating conditions the torque acting on the two-armed lever 13 through the tensioning force is greater than the torque occurring at the two-armed lever 13 upon rotation of the rotary valve system. If one of the two-armed levers 13 is pivoted out to position 13c counter to the action of the tensioning force in the case of a defect, a switching off or other indication is brought about through a responding means 19.

Figure 2:
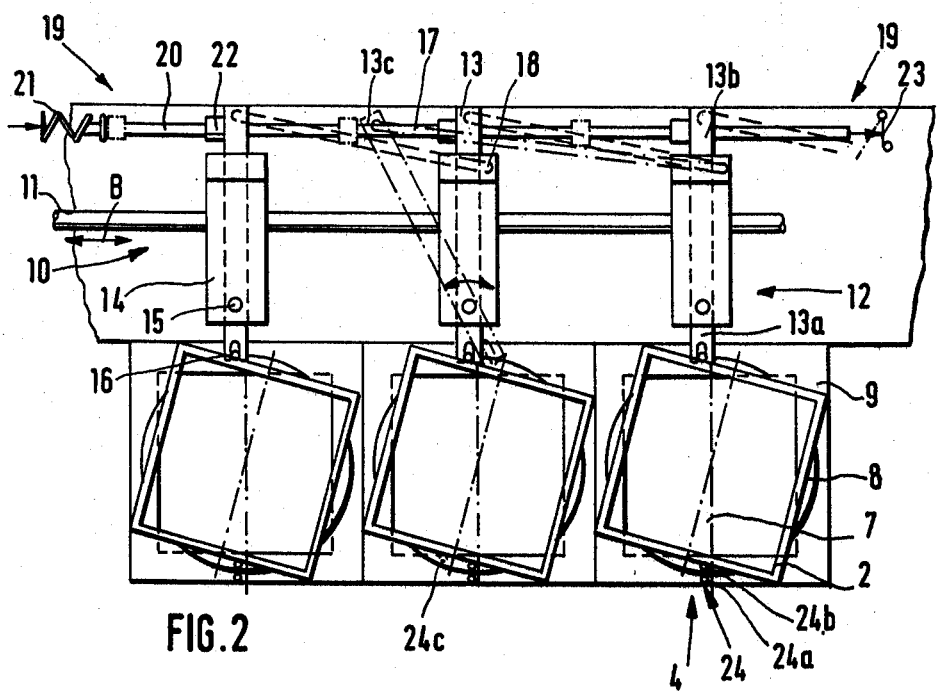
FIG. 2 is a detail of a schematic sectional view, taken along line II—II in FIG. 1.
Figure 3:
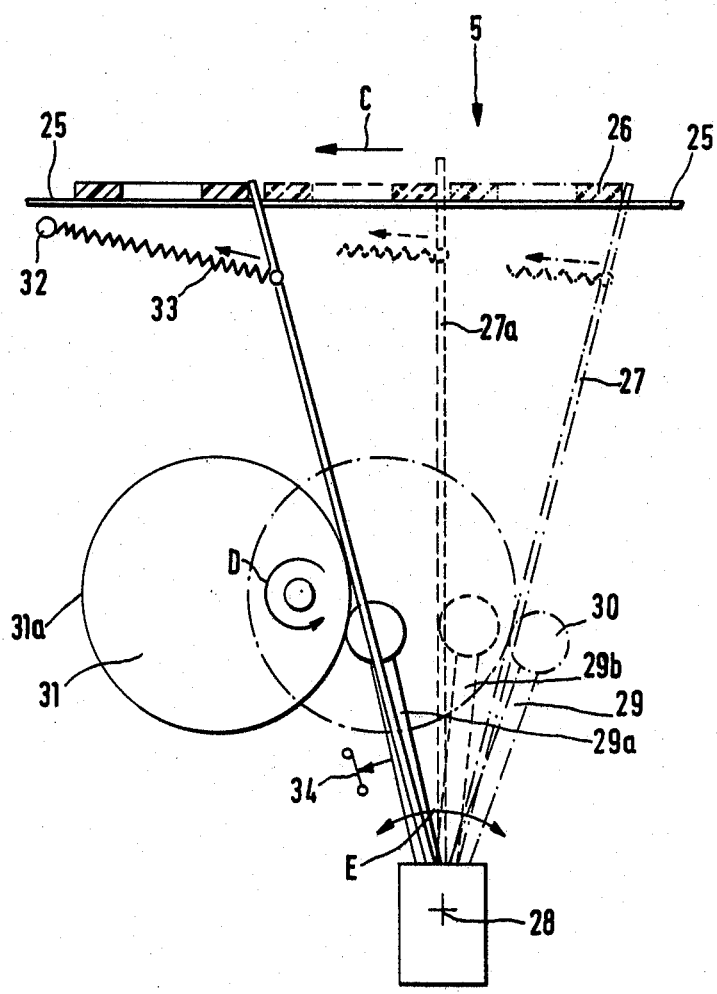
FIG. 3 is a detail of a schematic sectional view taken along line III—III in FIG. 1.

The responding means 19 comprises a shifting rod 20 arranged in the direction of the control shaft 11 and in the zone of the lever arms 13b and reciprocating in its longitudinal direction. Shifting rod 20 is tensioned to the right as seen in FIG. 2, through a tensioning means designed for example as a spring 21. On the shift rod 20, control cams designed as setting rings 22 are provided at intervals, against which the lever arms 13b abut. With the shift rod 20, a switch 23 can be operated, which is connected with a trigger means (not shown). The layout of the arrangement is such that the torque at the two-armed lever 13 jointly produced by the tensioning force of the extension spring 17 and the shift rod tensioning force produced by spring 21 is greater under normal operating conditions than the torque occurring upon rotation of the associated rotary valve 8. Accordingly, under normal operating conditions, the shift rod 20 is moved to and fro in the rhythm of the movement of the control shaft 11. But if in case of a defect at least one of the lever arms 13 pivots into position 13c, then the shift rod 20 is moved farther to the left beyond its end position normally directed toward the left as seen in FIG. 2, whereby a switching operation is triggered on switch 23. In the device here described as example of realization, this switching operation causes the machine to stop.

Means for indicating the angular position of the rotary valves are marked schematically by 24. These means are designed as visually recognizable marks 24a, 24b visible from the outside on the rotary valve and a fixed point outside the rotary valve. These means permit in a simple manner the recognition of that rotary valve in which a defect has occurred and in which, instead of a pivoting back of the rotary valve, the two-armed lever was pivoted out into the position 13c. In FIG. 2, the central rotary valve is shown with its movable mark at position 24c, displaced to the left of the fixed mark and not directly opposite the latter, as in the case of the other rotary valves, thereby indicating that the central rotary valve has a defect requiring attention.

The cross-transport means marked 5 as a whole comprises a slideway 25 for the crosswise transport of the slide frames in the direction of the arrow C. In the slideway 25 slots are provided, through which there engage swinging slide pusher rods 27 provided for application against the slide frames 26 to be transported. Each stacking chute 2 has a swinging slide pusher rods 27 associated with it. The swinging slide pusher rods 27 are arranged for joint pivoting on a pivot shaft 28. The reciprocating movement of the pivot shaft 28 is produced by the fact that on the pivot shaft 28 a lever 29 is secured, which via a roll element 30 applies against an eccentric 31. The eccentric 31 is rotatable in the direction marked D. Accordingly, upon rotation of the eccentric 31, lever 29 is moved to and fro in the direction of arrow E. At the same time all swinging slide pusher rods 27 are moved to and fro. This movement is matched with the drive of the rotary pusher rods systems in such a way that the swinging slide valves engage behind the singled slide frame and push it in direction C toward the lengthwise transport means 6.

The cross-transport means 5 is provided with a defect-response means, which goes into action when at least one of the slide frames 26 jams during action of the cross-transport means or the cross-transport is blocked in some other manner. For this purpose, an extension spring 33 is provided, arranged between a lever fixed on the pivot shaft 28, in the example shown on one of the swinging slide pusher rods 27, and a fixed point 32. Lever 29 rides against the eccentric 31 under the action of the extension spring 33. The layout of the arrangement is such that the couple acting on the arrangement of the swinging slide pusher rods 27 by the forces of spring 33 is greater under normal operating conditions over the entire movement path of the swinging slide pusher rods 27 than the oppositely acting couple caused by the frictional forces between the slide frames 26 and the slideway 25.

A switching means connected with a trigger means (not shown) is marked 34. The switching means 34 lies in the pivot zone of lever 29. When the end position of the eccentric marked 31a lies in the direction of action of the force of spring 33, switching means delivers a trigger signal when as an exception the lever 29 does not apply against the eccentric 31 under the action of spring 33. The normal position of lever 29 in this end position is marked 29a. In fact, if a defect occurs, so that the forces to be exerted by the swinging slide pusher rods 27 in the direction C on at least one slide frame are greater than in the normal case (for example if a slide frame cants), spring 33 lengthens upon a movement of the eccentric into the position 31a, so that the swinging slide pusher rods 27 stop for example in position 27a. In this case also lever 29 stops in position 29b, hence detaches from eccentric 31, does not reach the end position 29a, and thus cannot actuate the switching means 34. The absence of this actuation results in a trigger signal, which stops the drive of the swinging slide valve system. It is now possible to eliminate the defect. To prevent that for example after removal of a jammed slide frame from the cross-transport means, all swinging slide pusher rods 27 jump forward under the action of the force of spring 33, a mechanical locking means (not shown) may be provided, by means of which the swinging rods can be locked in the end position opposed to the direction of action of the force of spring 33.

What I claim is:

1. Apparatus for dispensing individual planar articles, such as slide frames, having non-round outer contours, comprising:
    a plurality of vertical dispensing chutes (2) each having an inside aperture shaped to receive a stack of said articles;
    a discharge chute (9) located below each of said dispensing chutes in axial alignment therewith, said discharge chute having an inside aperture of approximately the same contour as said article, but slightly larger than the latter so as to allow said articles to fall freely through them;
    said discharge chute being angularly offset with respect to said dispensing chute so that portions of the discharge chute project into the area enclosed within the inside aperture of the dispensing chute, forming shelves upon which the bottom article of the stack contained within the dispensing chute rests;
    singling means (4) arranged between each of said dispensing chutes and its associated discharge chute for dispensing said articles one at a time, said singling means comprising a rotary valve member (8) having an aperture shaped and dimensioned to receive a single one of said articles, said rotary valve member being rotatable between a first position in which its aperture is in registration with the aperture of said dispensing chute, and a second position in registration with the aperture of said discharge chute;
    the bottom article of the stack in said dispensing chute descending by gravity into the aperture of said rotary valve member and resting on said shelves when the rotary valve member is in said first position, and said bottom article dropping by gravity into the aperture of said discharge chute when the valve member is turned to said second position;
    a common control means (10) for simultaneously rotating all of said rotary valves comprising a control shaft (11) reciprocating in the horizontal plane; and separate spring-loaded, force-transmitting means (12, 13, 14, 17) connected between each of said rotary valve members and said control shaft, said force-transmitting means for any individual rotary valve member being yieldable to prevent excessive turning force being applied to the valve member in the event of a malfunction of that member.

2. The apparatus of claim 1, wherein said control means (10) includes a switch (23) for cutting off the power to the apparatus, and a reciprocating rod (20) extending parallel to said control shaft (11); said rod normally reciprocating between two end positions, and said rod being spring-urged to an extreme position beyond one of said end positions when one of said force-transmitting means (12, 13, 14, 17) yields; said rod actuating said switch to shut down the apparatus when the rod is moved to said extreme position.

3. The apparatus of claim 1, wherein said control means (10) comprises members (14) attached to said control shaft (11) and movable therewith; two armed levers (13) pivoted on said members; one arm (13a) of each two-armed lever being articulated to said rotary valve member; and spring means (17) connected to the other arm (13b) for yieldingly holding said lever in a fixed position with respect to said member.

4. The apparatus of claim 3, wherein each of said two-armed levers (13) abuts against a limit stop (18) on said member (14); and said spring means comprises a coil spring attached at one end to said other arm (13b) and at the other end to the next adjoining member (14); said coil spring normally holding said other arm (13b) against said limit stop; and being yieldable under excess torque of said rotary valve member to allow the other arm to swing away from said limit stop.

* * * * *